United States Patent
Malek et al.

(10) Patent No.: US 12,488,614 B2
(45) Date of Patent: Dec. 2, 2025

(54) METHOD AND SYSTEM FOR CONTACTLESSLY CAPTURING A BIOMETRIC FINGERPRINT

(71) Applicant: IDEMIA IDENTITY & SECURITY FRANCE, Courbevoie (FR)

(72) Inventors: Mokrane Malek, Courbevoie (FR); Joël-Yann Fourre, Courbevoie (FR); Elise Le Gouil, Courbevoie (FR); Grégoire Bezot, Courbevoie (FR)

(73) Assignee: IDEMIA PUBLIC SECURITY FRANCE, Courbevoie (FR)

( * ) Notice: Subject to any disclaimer, the term of this patent is extended or adjusted under 35 U.S.C. 154(b) by 0 days.

(21) Appl. No.: 18/911,413

(22) Filed: Oct. 10, 2024

(65) Prior Publication Data

US 2025/0182519 A1 Jun. 5, 2025

(30) Foreign Application Priority Data

Dec. 5, 2023 (FR) ..................... 2313552

(51) Int. Cl.
*G06V 40/13* (2022.01)
*G06V 10/10* (2022.01)
(Continued)

(52) U.S. Cl.
CPC .......... *G06V 40/1312* (2022.01); *G06V 10/16* (2022.01); *G06V 40/11* (2022.01); *G06V 40/60* (2022.01)

(58) Field of Classification Search
CPC .... G06V 40/1312; G06V 10/16; G06V 40/11; G06V 40/60; G06V 40/1318
See application file for complete search history.

(56) References Cited

U.S. PATENT DOCUMENTS 11,080,511 B2    8/2021    Shannon et al.
2012/0057762 A1*   3/2012    Rowe ................. G06V 40/1312
                                        382/115

(Continued)

FOREIGN PATENT DOCUMENTS

EP        4287148 A1 * 12/2023   ......... G06V 40/1312

OTHER PUBLICATIONS

French Preliminary Search Report & Written Opinion Issued May 3, 2024 in French Application 2313552 filed on Dec. 5, 2023, 10 pages.

*Primary Examiner* — Premal R Patel
(74) *Attorney, Agent, or Firm* — Oblon, McClelland, Maier & Neustadt, L.L.P.

(57) ABSTRACT

A method for contactlessly capturing a biometric fingerprint of part of a hand of a user in an acquisition volume, the method including successively acquiring at least two two-dimensional images of the part of the hand, involving, between said successive acquisitions, modifying the orientation of an object plane by rotating about a pivot axis, the at least two images comprising imaged points of the part of the hand common to said at least two acquisitions, the object plane being modified as a function of a modification of a given current plane for positioning the part of the hand, corresponding to the average current plane in which said part of the hand is located, for each two-dimensional image acquisition, and merging the acquired two-dimensional images of a surface of the part of the hand that is to be depicted.

15 Claims, 7 Drawing Sheets

(51) Int. Cl.
*G06V 40/10* (2022.01)
*G06V 40/60* (2022.01)

(56) References Cited

U.S. PATENT DOCUMENTS

| | | | |
|---|---|---|---|
| 2012/0076369 A1* | 3/2012 | Abramovich | G06V 40/1312 |
| | | | 382/126 |
| 2018/0268193 A1* | 9/2018 | Badzinski | H04N 7/188 |
| 2020/0074132 A1 | 3/2020 | Shannon et al. | |
| 2020/0202101 A1* | 6/2020 | Howell | G06V 40/1312 |
| 2023/0039567 A1 | 2/2023 | Fourre et al. | |
| 2023/0401888 A1* | 12/2023 | Nonomura | G06V 10/147 |

* cited by examiner

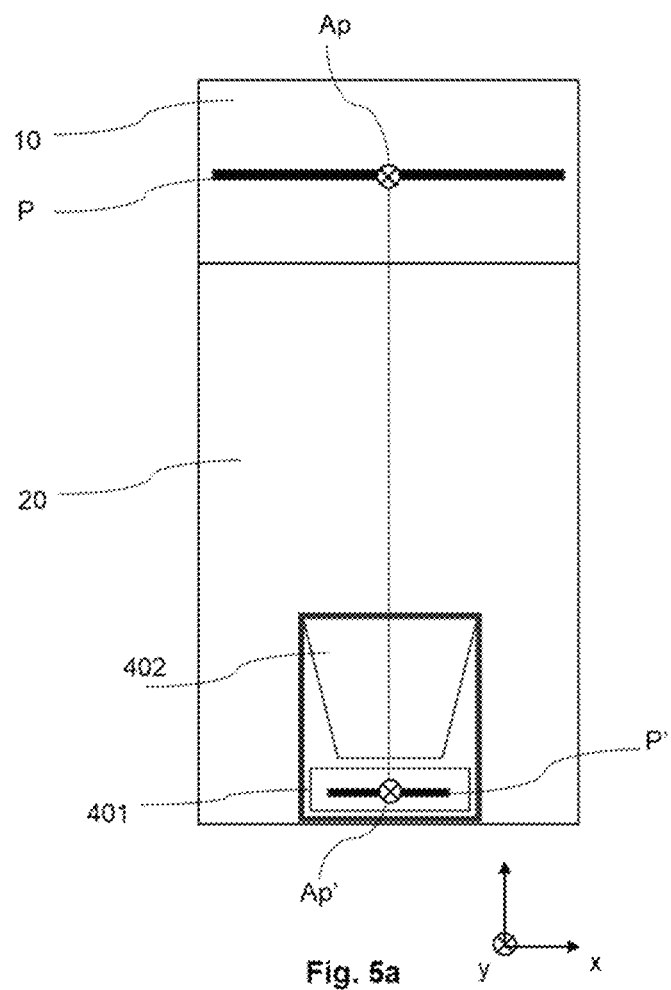

METHOD AND SYSTEM FOR CONTACTLESSLY CAPTURING A BIOMETRIC FINGERPRINT

The present invention relates to the field of contactlessly acquiring biometric fingerprints. More specifically, the invention relates to acquiring a biometric fingerprint of part of the hand of an individual, such as the palm of the hand, the fingers of the hand, the thumbs of each hand or the whole hand, as well as generating a synthetic image depicting the surface of the part of the hand.

Methods are known from the prior art for contactlessly capturing a biometric fingerprint of an individual involving generating a synthetic image of the finger with a view to obtaining a nail-by-nail sequence. The problem with these methods is that they require simultaneous two-dimensional capturing of the fingers from different angles, such that the contactless system for implementing this type of method must include multiple image-capture devices, which makes it particularly expensive, bulky and complex.

The invention aims to overcome the aforementioned problems of the prior art by proposing a method for contactlessly capturing a biometric fingerprint for reliably generating a three-dimensional model depicting the surface of the part of the hand that is compact, efficient and simple.

According to one aspect of the invention, a method is proposed for contactlessly capturing a biometric fingerprint of part of a hand of a user in an acquisition volume, said method comprising the following steps:

illuminating the acquisition volume so as to illuminate the part of the hand of the user;

successively acquiring at least two two-dimensional images of the part of the hand, involving, between said successive acquisitions of said at least two images, modifying the orientation of an object plane by rotating about a pivot axis; said at least two images comprising imaged points of the part of the hand common to said at least two acquisitions; said object plane being modified as a function of a modification of a given current plane for positioning the part of the hand, corresponding to the average current plane in which said part of the hand is located, for each two-dimensional image acquisition;

merging the acquired two-dimensional images of a surface of said part of the hand that is to be depicted.

This allows the surface area of the acquired image to be increased without multiplying the number of cameras and, as output from the device, allows an image to be provided that is interoperable with existing systems, which is notably achieved by allowing the acquisition of the two-dimensional image to be oriented by rotating the object plane about the pivot axis so as to image said part of the hand by making its average current positioning plane match the object plane.

Advantageously, the merging comprises a step of matching the common imaged points between said at least two acquired two-dimensional images.

In one embodiment, the method comprises, for at least one acquired two-dimensional image, a step of determining three-dimensional location information for said part of the hand acquired in said two-dimensional image;

and a step of associating the determined three-dimensional location information with said acquired two-dimensional image.

This allows, for at least one, at least part, or even for each acquired two-dimensional image, the three-dimensional location of said part of the hand in the acquisition volume to be deduced, with the three-dimensional information being primarily used to identify the current plane in which the hand is positioned, which provides advantageous assistance during merging.

Advantageously, the part of the hand comprises at least two fingers or a palm of the hand, with the surface that is to be depicted respectively extending from a first edge of a nail to a second edge of a nail via the pulp of each finger or from a first edge of the palm to a second edge of the palm via a palmar face of the hand, which equally allows fingerprints and palm prints to be imaged, including the writer's palm.

Advantageously, the method comprises a step of reconstituting an unwrapped image of the surface of the part of the hand that is to be depicted by using the determined three-dimensional information associated with the acquired two-dimensional image, which allows the unwrapped image of said surface of the hand that is to be depicted to be obtained simply.

Advantageously, the modification of the orientation of said object plane by rotating about the pivot axis is obtained by rotating the image plane about an axis of rotation, which allows a simple implementation to be provided, for example, by rotating the optical sensor on which the image plane is produced.

Advantageously, the modification of the orientation of said object plane is conditioned upon the detection of a modification of the current positioning plane of the part of the hand since the previous acquisition of a two-dimensional image.

In one embodiment, the method comprises a step of guiding the user promoting a change from the current positioning plane of the hand of the user to another suggested positioning plane of the hand of the user, notably by displaying virtual hand positions, with said virtual hand positions reflecting a rolling rotation of said virtual hand about the pivot axis relative to the current positioning plane of the hand of the user.

Advantageously, said other positioning plane of the hand of the user is suggested so that, during successive acquisitions, the successive determined positioning planes define a rolling angular scanning range of at least 10°, preferably 15°, which assists the user so that they position their hand in ideal configurations for acquiring the largest surface to be imaged in the least amount of time.

Advantageously, for the acquired two-dimensional image the step of determining the current positioning plane of the part of the hand is carried out by analyzing the three-dimensional information associated with said acquired two-dimensional image, which allows three-dimensional information to be used to assist locating.

According to another aspect of the invention, a detachable or non-detachable non-transient information storage means is proposed that is partially or fully readable by a computer or a microprocessor, comprising code instructions of a computer program for executing each of the steps of the method according to the invention, which allows the method according to the invention to be notably implemented via a computer program comprising instructions adapted for implementing each of the steps of the method according to the invention when said program is executed on a computer.

According to another aspect of the invention, a system is proposed for contactlessly capturing a biometric fingerprint of part of a hand of a user, comprising a user compartment delimiting an acquisition volume and an electronic compartment, the acquisition volume being adapted to receive said part of the hand of the user, the electronic compartment comprising:

means for illuminating the acquisition volume so as to illuminate the part of the hand of the user;

a two-dimensional imaging device with a fixed imaging axis, comprising at least two optical elements, including a sensor and an objective lens, with one of the two optical elements being free to rotate about the axis of rotation of the two-dimensional imaging device, said imaging device being capable of successively acquiring at least two images of the part of the hand, including, between said successive acquisitions of said at least two images, modifying the orientation of an object plane by rotating about a pivot axis and obtained by rotating said movable optical element;

said capture system also comprising:

a module for determining the positioning plane of the part of the hand, corresponding to the average current plane in which said part of the hand is located;

a module for modifying the object plane as a function of a modification of the determined current plane for positioning the part of the hand for each two-dimensional image acquisition;

a module for merging the acquired two-dimensional images of a surface of said part of the hand that is to be depicted.

In one embodiment, the rotatable optical element is the sensor.

In one embodiment, the pivot axis is oriented in a longitudinal direction of the acquisition volume and notably passes through a central point of the acquisition volume, which allows a rolling movement starting from a flat hand, which is ergonomically easy.

Advantageously, the orientation angle of the sensor is predetermined as a function of an optical parameter, such as a focal length of the objective lens or a distance between a center of symmetry of the acquisition volume and a center of the sensor, and of the optical magnification of the two-dimensional imaging device.

Advantageously, the capture system comprises:

a device for the three-dimensional acquisition of three-dimensional information from the acquisition volume;

a module for determining three-dimensional location information for said part of the hand in at least one acquired two-dimensional image;

a module for associating the determined three-dimensional location information with said acquired two-dimensional image;

a module for reconstituting an unwrapped image of the surface of the part of the hand that is to be depicted by using the determined three-dimensional information associated with the acquired two-dimensional image.

Advantageously, the two-dimensional imaging device with a fixed imaging axis comprises a single sensor and a single objective lens.

Advantageously, for each determined current positioning plane, the plane of the movable optical element is modified by rotating about the axis of rotation of said movable optical element, so that the plane conjugate to the determined current positioning plane of the part of the hand is coincident with a sensor plane.

Advantageously, the acquisition volume in the user compartment comprises an entry section formed by a front opening and has a depth that allows the part of the hand to be inserted from a tip of the fingers, in a direction, called longitudinal direction, with said acquisition volume being of variable height in a transverse direction with a central constriction.

Advantageously, said entry section forms a lobe extending on either side of the central constriction, notably symmetrically, with said lobes notably having an opening angle of 40° to 90°.

Advantageously, the height of the front opening at the central constriction measures 30 mm to 60 mm.

Advantageously, the means for illuminating the surface that is to be depicted comprises a plurality of light sources.

Advantageously, the device for three-dimensionally acquiring three-dimensional information from the acquisition volume comprises a three-dimensional time-of-flight camera, or a stereovision camera system, or a three-dimensional structured light camera.

Advantageously, at least one light source is arranged alongside the two-dimensional imaging device, by means of which the surface that is to be depicted can be at least partially illuminated.

Advantageously, the lighting means comprises a plurality of light sources annularly placed around the two-dimensional imaging device.

According to one aspect of the invention, the light sources of the plurality of light sources are arranged at equal distances from the image-capture device.

Advantageously, the lighting means comprises a blue or green diode.

Advantageously, the lighting means emits near infrared or near ultraviolet light.

Advantageously, the capture system comprises at least one polarizer arranged in front of the two-dimensional imaging device or the lighting means.

According to one aspect of the invention, the capture system comprises an information processing device capable of correcting distortions in a two-dimensional image acquired by the two-dimensional acquisition device.

Further advantageous features of the invention will become apparent from reading the description and with reference to the drawings.

FIG. 5a illustrates a cross-sectional view of the contactless biometric fingerprint capture system of FIG. 4 in use during a first acquisition.

FIGS. 1a and 1b illustrate a contactless biometric fingerprint capture system 1 capable of acquiring an image of a fingerprint of part of a hand of a user, for example, the palm of a hand, one or more fingers of a hand or several hands (a thumb of each hand, for example), or the whole hand.

The biometric fingerprint capture system 1 comprises an acquisition volume 10 and an electronic compartment 20, whose x, y, z reference frame is shown.

Figure 1A:
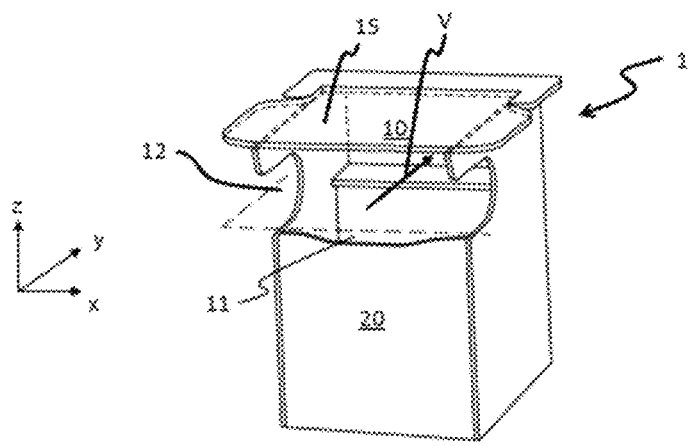
FIG. 1a shows a contactless biometric fingerprint capture system according to a first embodiment.
Figure 1B:
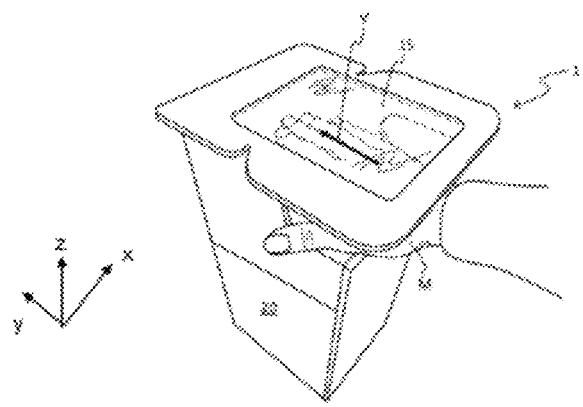
FIG. 1b shows the contactless biometric fingerprint capture system of FIG. 1a in use by a user.

According to one embodiment illustrated in FIGS. 1a and 1b, the acquisition volume 10 is delimited by the walls of the user compartment.

The biometric fingerprint capture system 1 can comprise a single substantially parallelepiped block, also called terminal, comprising walls common to the user compartment and to the electronic compartment 20, or it even can be an assembly of a physical block of the user compartment and of a physical block of a different electronic compartment.

The user compartment and the electronic compartment 20 can be partitioned off from each other, for example, by a separation pane. The separation pane is preferably located in the electronic compartment 20, notably on the upper surface of the electronic compartment. The separation pane advantageously can be oriented in order to limit reflections or to make it easier to clean. The separation pane advantageously has optical functions, such as polarization or wavelength filtering.

The user compartment and the electronic compartment 20 are preferably separated by a physical partition one on top of the other, as shown in FIG. 1a, so as to use the architecture to guide the positioning of the hand of the user.

The user compartment comprises at least one opening for the passage of the part of the hand with the biometric fingerprint to be imaged.

For example, as shown in this case, the lateral sides of the user compartment are preferably indented, i.e., the edge is hollowed out, forming two lateral openings 11, to allow ergonomic positioning of a thumb (notably of each hand) on each inner side of the compartment or to position a thumb of the hand outside the compartment and the other fingers of the hand inside the compartment, which blocks the forward movement of the hand (as shown in FIG. 1b), but also to form a potential support for the thumb in order to limit hand tremors without affecting the rotational mobility of the fingers.

The user compartment delimiting the acquisition volume 10 comprises a front opening 11 and has a depth allowing the hand of the user to be inserted from a tip of the fingers, and notably as far as the palm, in a direction, called longitudinal direction. In FIGS. 1a and 1b, it assumes a substantially parallelepiped shape.

The height (along z) of the acquisition volume is constant in this case, both in the transverse direction (along x) and in the longitudinal direction (along y), notably from 40 mm to 100 mm to allow the passage of four fingers spaced apart in different orientations. The width of the acquisition volume is preferably 100 mm to 150 mm, for example, 140 mm, as is its depth, for example, 125 mm, so as to be able to image several fingers, and notably a palm or even the lateral part of the palm on the side opposite the thumb, also called writer's palm, with a minimum acquisition surface area of 10,000 $mm^2$.

In FIG. 1a, the acquisition volume has a substantially horizontal, non-inclined median plane 12. This example is not limiting; depending on the ergonomic choices, this plane can be inclined, thus, depending on the installation height of the contactless biometric fingerprint capture system, if the acquisition volume is positioned lower than the elbow, its median plane is advantageously inclined downward toward the depth in relation to the longitudinal direction; and, by contrast, if the acquisition volume is positioned higher than the elbow, its median plane is advantageously inclined upward.

For example, the user compartment 20 comprises a front opening 11 allowing a hand to pass through from the tips of the fingers and notably as far as the beginning of the wrist of the user, in a direction, called longitudinal direction.

The capture system 1 of the invention can be used for acquiring part of a hand comprising one or more fingers D, for example, for acquiring a finger D, several fingers D (of one or more hands), or the palm of a hand.

The acquisition volume 10 is adapted to receive said part of the hand M of the user so that the direction of insertion of said part of the hand M of the user corresponds to the direction of the orientation vector V, with the fingers of the part of the hand M pointing toward said orientation vector V as illustrated in FIG. 1b, for example.

FIG. 1b illustrates the contactless capture system 1 of FIG. 1a in use by a user. The part of the hand M of the user is positioned in the acquisition volume 10 with a view to the biometric acquisition of a part of the hand in this case comprising the index, the middle, the ring and the little fingers. The acquisition volume 10 receives the part of the hand M of the user in a current positioning plane corresponding to the average plane of the hand. By way of an example, in FIG. 1b the current positioning plane of the part of the hand M and the median plane 12 of the acquisition volume 10 are coplanar.

Advantageously, said user compartment comprises a transparent, preferably glazed, portion on an outer face 15 to allow the user to view and better position their part of the hand, for which the biometric fingerprint is to be imaged, in a positioning plane.

The part of the hand M for which the biometric fingerprint is to be imaged must face the electronic compartment 20.

The electronic compartment 20 comprises:
  a means for illuminating the acquisition volume 10 capable of generating at least one light beam toward the acquisition volume 10 so as to illuminate the part of the hand of the user located in the acquisition volume;
  a device 50 for three-dimensionally acquiring three-dimensional information from the acquisition volume 10;
  a two-dimensional imaging device 40 with a fixed imaging axis (in the reference frame of the electronic compartment 20), in this case vertical, comprising at least two optical elements including a sensor and an objective lens, the arrangement of which defines an object plane and an image plane. At least one of the two optical elements can be rotated in a rolling movement about an axis of rotation, so as to vary the object plane, for example, by rotating the image plane if the sensor 401 is the movable element, with said imaging device being able to successively acquire at least two images of the part of the hand M between which the current determined positioning plane of the part of the hand has varied; by modifying the orientation of the object plane between said successive acquisitions of said at least two images by rotating about a pivot axis; with said at least two images comprising imaged points of the part of the hand common to said at least two acquisitions; with said object plane being modified as a function of a modification of a determined current positioning plane of the part of the hand M. The pivot axis is notably perpendicular to the fixed imaging axis and parallel to the orientation vector V of the hand belonging to the average plane of the acquisition volume 10.

The capture system 1 also comprises, either in an information processing device within the electronic compartment 20, or on a remote server connected to the information processing device of the electronic compartment 20:

a module for determining the positioning plane of the part of the hand, corresponding to the average current plane in which said part of the hand M is located;

a module for modifying the object plane by rotating about the pivot axis Ap as a function of a modification of the determined current plane for positioning the part of the hand M for each two-dimensional image acquisition, notably in the form of a computation sub-module and of a control sub-module controlling the rotational mobility actuator (for example, a motor) about the axis of rotation Ap';

a module for merging the acquired two-dimensional images of a surface of said part of the hand that is to be depicted.

"Merging" is understood to mean the production of a single image from multiple images, including by selection. Preferably, as many merged images are obtained as there are surfaces of the part of the hand that is to be depicted; for example, for several fingers there would be as many merged images as there are fingers-surfaces to be imaged; nevertheless, a single three-dimensional image depicting all the surfaces to be imaged also can be provided by the merging.

Advantageously, the pivot axis Ap is oriented in a longitudinal direction of the acquisition volume 10 and passes through a central point of the acquisition volume 10.

Preferably, the contactless biometric fingerprint capture system 1 comprises:

a device for three-dimensionally acquiring three-dimensional information from the acquisition volume;

a module for determining three-dimensional location information for said part of the hand in at least one acquired two-dimensional image;

a module for associating the determined three-dimensional location information with said acquired two-dimensional image;

a module for reconstituting an unwrapped image of the surface of the part of the hand that is to be depicted by using the determined three-dimensional information associated with the acquired two-dimensional image.

As many unwrapped images are thus obtained as there are surfaces of the part of the hand to be depicted; for example, for several fingers there would be as many unwrapped images as there are fingers-surfaces to be imaged.

For example, the surface that is to be depicted extends, in the case of fingers, from a first edge of a nail to a second edge of a nail via the pulp of each finger or, respectively, in the case of a palm, from a first edge of the palm to a second edge of the palm via the palmar surface of the hand, with said biometric fingerprint respectively being digital or palmar.

Figure 2:
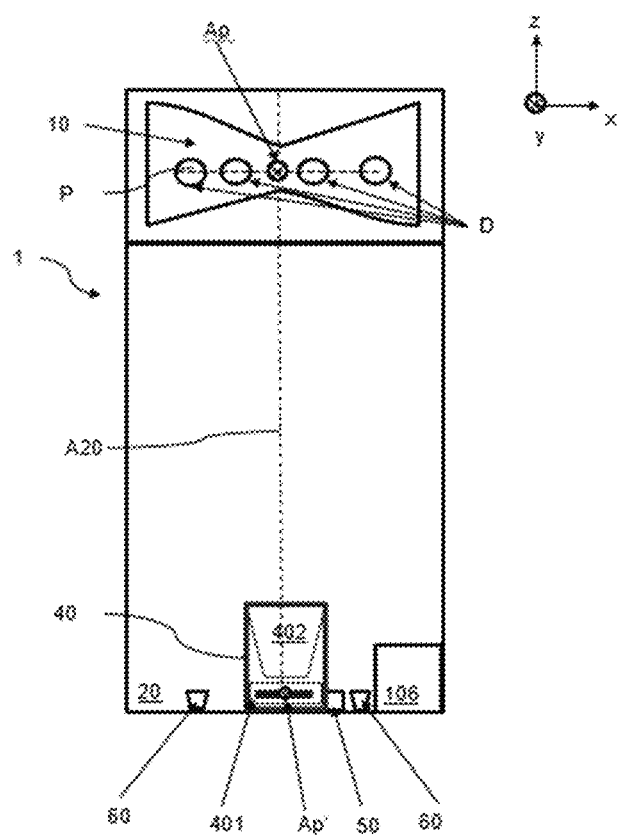
FIG. 2 shows a schematic diagram of the architecture of the capture system according to one embodiment of the invention.

FIG. 2 illustrates the architecture of the capture system 1 according to one embodiment of the invention. This figure shows the acquisition volume 10 equipped with a two-dimensional imaging device 40. This two-dimensional imaging device 40 is used to acquire images of the surface of the fingers D of the hand M that is to be depicted.

As before, the front opening of the user compartment delimiting the entry area of the acquisition volume 10 has a preferred width and depth of 100 mm to 150 mm; however, in this FIG. 2 the height varies in a transverse direction, notably from 100 mm to 110 mm at the ends with a central constriction of 30 mm to 60 mm. This architecture forms a butterfly-shaped entry section with a lobe extending on either side of the central constriction, this shape intuitively assisting the user by imposing limits on hand movement and by actually clearly defining the pivot axis Ap around which the hand rotates, notably restricting the amplitude of movement of the hand of the user. Preferably, the opening angle of each lobe (in the vertical plane in this case) is 40° to 90°. Advantageously, the contour forming the vertical entry area is symmetrical along the longitudinal axis and the transverse axis, with a central point at the intersection of these two axes. Advantageously, the height is variable according to the depth, so as to allow the conformation of the hand to be respected, which thickens from the fingertip to the wrist and allows the part of the hand M to be mobile by rolling about the pivot axis Ap; the acquisition volume therefore has a passage volume with a variable-section, decreasing depth-wise, in the shape of a butterfly.

The two-dimensional imaging device 40 is optically configured so as to allow the hand to be captured in the acquisition volume 10 and comprises at least two optical elements, including a sensor 401 and an objective lens 402. Preferably, the two-dimensional imaging device 40 comprises a single sensor 401 and a single objective lens 402, since due to the mobility of the at least one optical element, multiple sensors or objective lenses are not needed in order to image the one or more surfaces of the part of the hand that is to be depicted, which allows the system 1 to be more compact. The sensor 401 comprises the photosensitive surface of the two-dimensional imaging device 40. The fixed imaging axis A20 of the two-dimensional imaging device 40 is fixed in the reference frame of the electronic compartment 20 and passes through fixed reference points of the sensor 401 and of the objective lens 402, notably through the center of the sensitive surface of the sensor 401 and the center of the objective lens 402 in the case of a thin lens approximation. In the figure, this imaging axis A20 is vertical, although this example is not limiting, as the imaging axis A20 can be inclined.

In order to modify the object plane, i.e., the focusing plane, an element of the imaging chain, in this case the sensor, therefore can be inclined by rotating it about its axis of rotation Ap'. In the case described herein, but which is not limiting, of the mobile sensor 401 and the fixed objective lens 402, the fixed imaging axis A20 always remains coincident with the optical axis of the objective lens, and to obtain a clear image the sensor 401 must be in a plane conjugate (through the objective lens 402) to the determined current positioning plane P of the part of the hand. Furthermore, if the hand is inclined relative to the imaging axis, these two planes are therefore inclined relative to each other. In general, one of the two optical elements 401, 402 (according to the principle of equivalence) is free to rotate so as to be able to scan an angular range by inclining the movable optical element relative to the fixed imaging axis A20 and position itself in a plane conjugate to the determined current positioning plane P of the part of the hand. By design, the pivot axis Ap in this case belongs to the horizontal plane of symmetry of the acquisition volume 10 and the axis of rotation Ap' of the image plane is parallel to the pivot axis Ap.

In order to ensure rotational mobility, the movable optical element is controlled by an actuator, notably a motor (motor not shown), allowing it to be oriented in space. In the embodiment, it is fitted with a motor allowing it to rotate in the vertical plane. Advantageously, the motor is of the brushless type, notably direct drive, which allows continuous movement of the motor. This type of brushless motor allows the movable element to freely and continuously follow changes in the positioning plane P of the hand without affecting image capturing, which is particularly advantageous in the embodiment involving direct control of the motor as a function of the positioning plane of the hand determined in real-time by analyzing the three-dimensional information that is continuously acquired during the movement. When the motor is in direct drive, the absence of a gearbox specific to these motors eliminates any associated operating play. This would not be possible with a stepper motor controlled using a step-by-step control method, which is nevertheless of interest for the embodiment involving step-by-step guidance of the hand of the user. As a variant, a magnetic actuator (voice coil), a galvanometric motor or even a piezoelectric motor also advantageously can be used if the movement is not too small; these solutions are easier to implement and are faster than rotary motors and allow continuous movement.

The focusing distance, namely, in this case the distance between the objective lens 402 and the hand along the fixed imaging axis A20, is predetermined in the embodiment with the thin passage section. Consequently, the distance between the center of the sensor 401 and the objective lens 402 along the imaging axis does not vary either. As a variant, these distances also could be variable, without undermining the invention.

The lighting means 60 is used to illuminate the one or more surfaces to be depicted and comprises, for example, a single light source or a plurality of light sources. A light source can be an extended or point light source. A light source 60 can have a wide or concentrated diffusion angle. The light source can have an average diffusion axis approximately colinear with the imaging direction A20 or alternatively can be inclined relative to the imaging direction A20. The light sources 60 shown herein are multiple light sources and are arranged alongside the two-dimensional imaging device 40, so as to illuminate the one or more surfaces to be depicted. Advantageously, the lighting means 60 comprises several light sources annularly placed around the two-dimensional imaging device 40, i.e. arranged at equal distances from the two-dimensional imaging device 40, so as to uniformly illuminate the one or more surfaces to be depicted. Advantageously, the lighting means 60 comprises a red, blue or green light-emitting diode (or super-light-emitting diode), since diodes create fewer blemishes than lasers. The lighting means 60 emits in the visible (preferably with a wavelength of less than 600 nm), near infrared or near ultraviolet range depending on the context and the desired image quality. The upper wall, preferably glazed, of the user compartment, also called the cap, can be reduced when light leakage is neither dazzling nor dangerous.

The capture system 1 advantageously comprises a polarizer (not shown) arranged in front of the two-dimensional imaging device 40 or in front of the lighting means 60, since using polarized lighting and an imaging device in the same polarization promotes the image of the surface, as the light penetrating the finger is depolarized by the successive diffusions, and in the case of the fingerprint, this promotes the contrast between the ridges and furrows. In practice, one or more linear (or circular) polarizers is/are placed, all parallel to each other, in front of the two-dimensional imaging device 40 and the one or more lighting sources 60; alternatively, a single large linear polarizer can cover the whole device. An orthogonal polarizer is then placed on the glazed part 15 of the upper wall in order to prevent any light leakage and to protect the user from glare.

The three-dimensional acquisition device 50 can be independent and can comprise, for example, a three-dimensional time-of-flight camera, or a stereovision camera system or a three-dimensional structured light camera, or can be partly integrated into the two-dimensional imaging device 40, for example if one of the cameras of a stereovision system is the two-dimensional imaging device 40 or if the sensor 401 of the two-dimensional imaging device 40 is also capable of acquiring structured light, with the structured light projector preferably being outside the two-dimensional imaging device 40. This three-dimensional acquisition device 50 for acquiring three-dimensional information from the acquisition volume is preferably arranged close to the two-dimensional imaging device 40. The three-dimensional information acquired by the three-dimensional acquisition device 50 is advantageously used by the processing device to generate the unwrapped image of the surface of the part of the hand that is to be represented. Preferably, it is optimal for the three-dimensional acquisition device 50 to capture at least the entire area imaged by the two-dimensional imaging device 40, which will be retained in the final image (i.e. the acquired part of the hand, namely, the fingerprints: dermatoglyphic areas on the fingers and/or palms).

The capture system 1 is controlled by an information processing device 106 that notably controls the movements of the motor of the movable optical element. Preferably, but not necessarily, this information processing device 106 also receives and processes the images received from the two-dimensional imaging device 40, as well as the acquisitions from the three-dimensional acquisition device 50 when it is present. The information processing device 106 typically comprises at least a calculator, a computer, a tablet or any other device for executing a computer program responsible for controlling the movable optical element, for acquiring images and for the various steps of the method according to the invention. The information processing device 106 comprises the module for determining the current positioning plane P of the part of the hand, in which the hand stretches, as well as the module for associating the two-dimensional images and the three-dimensional information; and the module for merging the acquired two-dimensional images of a surface of said part of the hand that is to be depicted. Advantageously, if a device 50 for three-dimensionally acquiring three-dimensional information from the acquisition volume is present, then the information processing device 106 also comprises:

a module for determining three-dimensional location information for said part of the hand in at least one acquired two-dimensional image;

a module for associating the determined three-dimensional location information with said acquired two-dimensional image;

a module for reconstituting an unwrapped image of the surface of the part of the hand that is to be depicted using the determined three-dimensional information associated with the acquired two-dimensional image, these modules being able to be housed locally in the electronic compartment or on a remotely accessible server.

By virtue of its arrangement, and notably its movable optical element, this capture system 1 is compact while allowing enough two-dimensional images and three-dimensional information to be acquired to reconstitute an unwrapped image of the surface of the part of the hand that is to be depicted.

Figure 3:
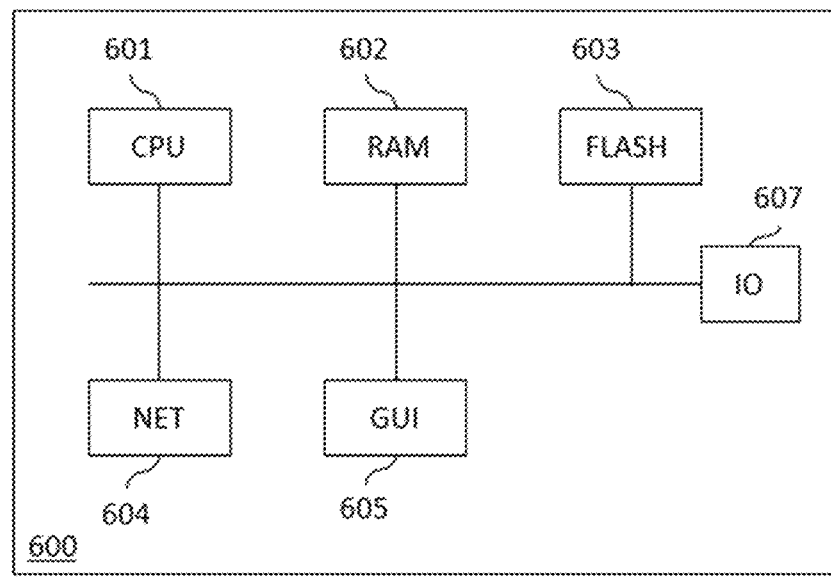
FIG. 3 is a schematic block diagram of an information processing device for implementing one or more embodiments of the invention.

FIG. 3 is a schematic block diagram of an information processing device 600 for implementing one or more embodiments of the invention. This device typically corresponds to the device 106 of FIG. 2. The information processing device 600 can be a peripheral device such as a nanocomputer, a workstation or a mobile telecommunications terminal. The device 600 comprises a communication bus connected to:

a central processing unit 601, such as a microprocessor, denoted CPU;

a transient memory 602, denoted RAM, for storing the executable code of the method for carrying out the invention, as well as the registers suitable for storing the variables and parameters required for implementing the method according to the embodiments of the invention; the memory capacity of the device can be supplemented by an optional RAM memory connected to an expansion port, for example;

a non-transient memory 603, denoted FLASH, for storing the computer programs and calibration data for implementing the embodiments of the invention;

a network interface 604, denoted NET, is normally connected to a communications network over which digital data to be processed is transmitted or received. The network interface 604 can be a single network interface, or can be made up of a set of different network interfaces (for example, wired and wireless interfaces or various types of wired or wireless interfaces). Data packets are sent over the network interface for transmission or are read from the network interface for reception under the control of the software application running in the processor 601;

a user interface 605 for receiving inputs from a user or for displaying information to a user;

an input/output module 607 for receiving/sending data from/to external peripheral devices such as a hard disk, removable storage media or the like.

The executable code can be stored in a non-volatile memory 603, for example a flash memory or a read-only memory, on the storage device 606 or on a removable digital medium, such as a disk, for example. According to one variant, the executable code of the programs can be received by means of a communication network, via the network interface 604, in order to be stored in one of the storage means of the communication device 600, such as the storage device 606, before being executed.

The central processing unit 601 is adapted to control and direct the execution of the instructions or portions of software code of the program or programs according to one of the embodiments of the invention, which instructions are stored in one of the aforementioned storage means. After power-up, the CPU 601 is capable of executing instructions from the transient RAM 602, relating to a software application. Such software, when executed by the processor 601, causes the described methods to be executed.

The information processing device 600 as illustrated is local, but it also can be distributed and comprise multiple processing units, notably physically remote units (outside the terminal) communicating with each other via the network interface, in the same way as part of the memory can be physically remote, hosted on servers, for example. For example, the determination module and/or the association module and/or the reconstitution module may not be housed locally but in a physically remote processing unit, in order to pool existing computing capacities or to make the terminal even more compact.

Figure 4:
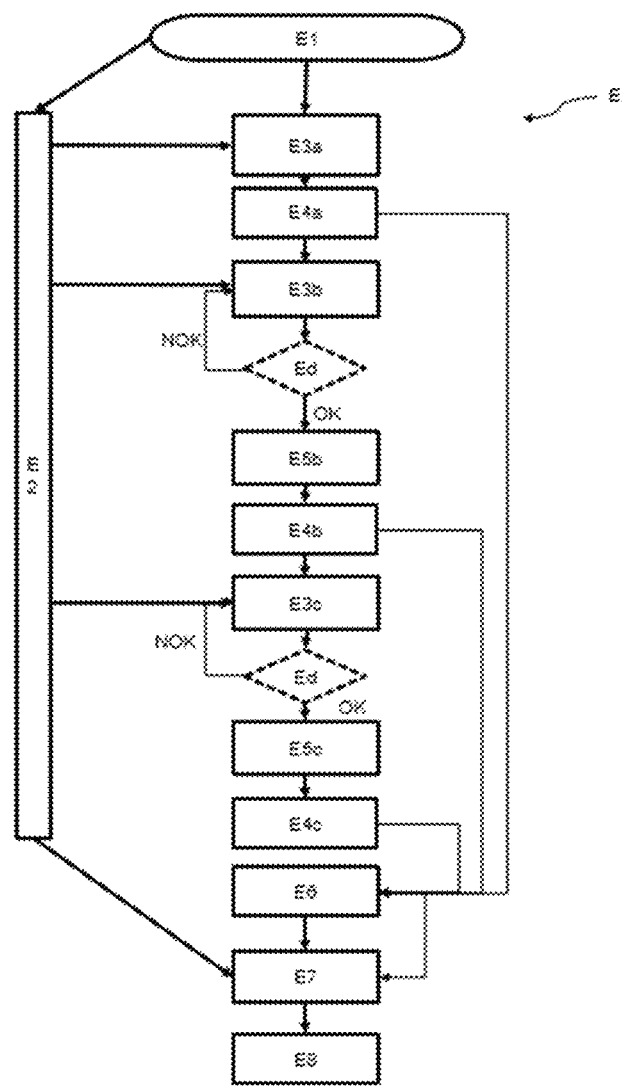
FIG. 4 illustrates the capture method in one embodiment of the invention.

FIG. 4 shows the capture method E in one embodiment of the invention. The method E is described herein in connection with the capture system 1 illustrated in the previous figures.

The method E for contactlessly capturing a biometric fingerprint of part of a hand M of a user in an acquisition volume 10 advantageously comprises the following steps:

initializing E1 the device when it is switched on;

acquiring E2 three-dimensional information from the acquisition volume;

determining E3a, E3b, E3c the current positioning plane P of the part of the hand, preferably initiated, for example, prior to the two-dimensional acquisitions E4a, E4b, E4c, notably so as to have determined current positioning planes P available that are specific to the time steps of the two-dimensional acquisitions E4a, E4b, E4c, on the basis of the acquired three-dimensional information;

illuminating the acquisition volume 10 so as to illuminate the part of the hand of the user, for the qualitative acquisition of the two-dimensional images;

successively acquiring E4a, E4b, E4c, by means of the two-dimensional imaging device 40, an optical element of which (the image sensor 401 or the objective lens 402) is free to rotate about the axis of rotation Ap' perpendicular to the fixed imaging axis A20, three images of the part of the hand stretching in a positioning plane, with, between each successive acquisition:

a deduction step Ed for modifying the determined current positioning plane P of the part of the hand so as to modify the object plane by rotating the optical element about the axis of rotation Ap' if the determined current positioning plane P of the hand has changed between two acquisitions Ed=OK, notably by a rolling movement of the part of the hand about the orientation vector V of the hand, by design substantially parallel to the pivot axis Ap;

with said at least two two-dimensional images comprising imaged points of the part of the hand common to said at least two acquisitions;

a merging step E6 for merging the acquired two-dimensional images of a surface of said part of the hand that is to be depicted, notably comprising matching common points between said at least two two-dimensional images, so as to produce one merged image per finger D, for example;

a step E7 of associating the determined three-dimensional location information corresponding to each two-dimensional acquisition with said corresponding acquired two-dimensional image;

a step E8 of reconstituting an unwrapped image of the surface of the part of the hand that is to be depicted using the determined three-dimensional information associated with the acquired two-dimensional image.

The aim is to have several two-dimensional images of the same finger acquired as the finger is rotated relative to the imaging axis A20. In other words, the successive two-dimensional acquisitions of said at least two images in at least two different directions form at least two views of the surface that is to be depicted. The use of three-dimensional information, which is optional, above all optimizes the adjustment of the two-dimensional acquisitions and improves image processing.

With respect to the implementation of the capture method, two embodiments notably can be cited.

According to a first embodiment, the user is guided by means of sequential instructions issued by the user interface 605, notably by voice guidance and/or a display, for example by means of a screen (displaying virtual hand positions, for example) and/or LEDs located on either side of the acquisition zone on the front walls of the front opening of the user compartment so as to show the acquired plane or the plane to be acquired by the flickering of the LEDs located in the extension of this plane. Advantageously, in this embodiment, the color of the LEDs is used to show the user the expected plane correction in order to help the user to position their hand in the required predetermined positioning plane P. As a variant, the user can be guided by an operator. The user will therefore position their hand in a predetermined positioning plane P, according to the guidance instructions, with these guidance instructions telling them, for example, to initially position their hand so that it is flat, then to incline their hand clockwise by 15° relative to the horizontal plane about the pivot axis Ap oriented in the longitudinal direction and passing through the mid-point of the constriction of the front opening.

According to a second embodiment, the user is guided by means of a general instruction that is issued, notably continuously, by the user interface 605 while the user is using the system 1. This guidance is notably provided by displaying a rolling movement and optionally by voice guidance. Advantageously, the display can include holographic elements. The user will then insert their hand to make it move according to the designated movement in the acquisition volume 10, with the proposed continuous movement (for example, a rolling movement of the hand or a scrolling movement) allowing the hand to be inclined so that it assumes a number of different poses, allowing as many acquisitions in various positioning planes. To this end, the motor of the optical element of the two-dimensional capture device 40 is controlled in real-time, notably by a real-time processor of the processing device 600, on the basis of analyses of the three-dimensional information that is itself continuously acquired. The current positioning plane determined on the basis of the acquired three-dimensional information is used by the control module to impose an orientation on the camera sensor so that the image captured by this sensor is sharp. In other words, the points belonging to the object plane and the points belonging to the image plane are governed, in terms of geometric optics, by the conjugation relationship linking the position of an object point located in the object plane to that of its image, formed by the two-dimensional imaging device in the image plane.

It should be noted that for these embodiments, the acquisition volume 10 is not necessarily butterfly-shaped, as the user compartment can be a parallelepiped, for example, in order to improve the fluidity of the hand movement.

Figure 5B:
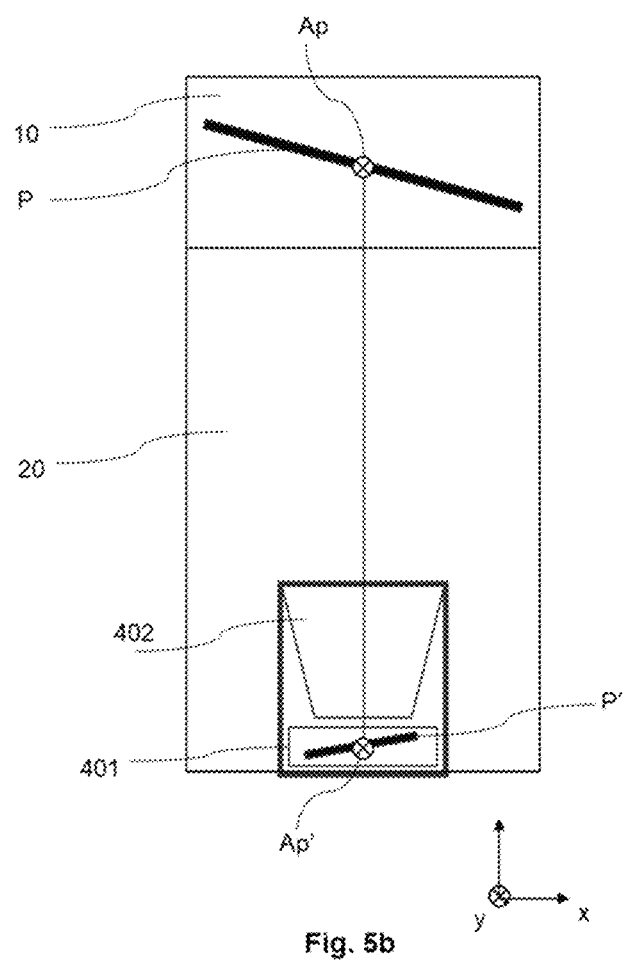
FIG. 5b illustrates a cross-sectional view of the contactless biometric fingerprint capture system of FIG. 4 in use during a second acquisition.
Figure 5C:
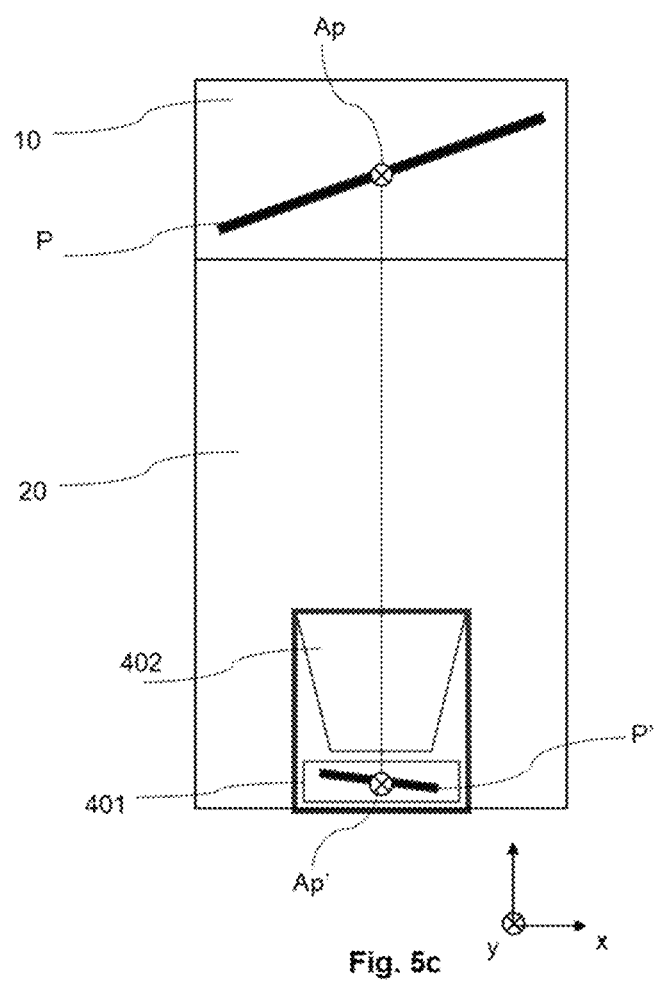
FIG. 5c illustrates a cross-sectional view of the contactless biometric fingerprint capture system of FIG. 4 in use during a third acquisition.

FIGS. 5a, 5b and 5c illustrate three successive acquisition steps E4a, E4b and E4c when implementing this method E according to the first embodiment (sequential guidance: multiple phases), more specifically described hereafter. In the embodiment illustrated by these figures, the contactless biometric fingerprint capture system 1, i.e. in this case biometric data from the four fingers D of the hand, has the image sensor 401 as an optical element that can be rotated about the imaging axis A20.

The step E1 of initializing the device when it is started up involves controlling the motor of the movable element, in this case the sensor 401, so as to position it in the horizontal plane, as illustrated in FIG. 5a. A control module, in this case housed in the processing device 106, therefore provides instructions for orienting the sensor 401 of the two-dimensional capture device 40 horizontally in order to record the first image.

Correlatively, during this initialization step E1, a first instruction is therefore sent to the user inviting them to insert their hand M with the fingers D spread apart in order to position it in the horizontal median plane of the acquisition volume. Indeed, arranging the hand with the four fingers of the hand spread apart makes the edges of each of the fingers more visible to the imaging device 40.

The initialization step E1 triggers the illumination of the acquisition volume 10 so as to illuminate the fingers D that the user inserts, and this illumination is preferably maintained until the end of the method, as shown in FIG. 4. As a variant, the illumination could be triggered by a proximity detector to prevent illumination in the absence of the user. As a variant, illumination is only provided when acquiring two-dimensional images, which limits energy consumption.

Advantageously, the initialization step E1 triggers the acquisition E2 of three-dimensional information from the acquisition volume, this acquisition being able to be continuous, as shown in FIG. 4, or to be triggered after a timeout on completion of the transmission of the guidance instruction, so as to check that the hand is correctly positioned in the expected plane. This first acquisition in the horizontal configuration records information from the central parts of the fingerprints of the four fingers D.

The step E3a of determining the current positioning plane P of the part of the hand in this embodiment can be simple because the average orientation of the hand is assumed to be known: with the current positioning plane P of the hand being that required by the guidance, i.e. in this example: horizontal: 0 degrees.

In addition, the current positioning plane P of the hand can be computed on the basis of the acquired three-dimensional information. Depending on the acquisition frequency E2 for three-dimensional information, processing through a real-time analysis of the three-dimensional information allows the current positioning plane P to be computed on the basis of the three-dimensional information acquired over the current time step or on the basis of the last three-dimensional image acquired at an instant t that is substantially equal to the current instant. The three-dimensional acquisition device 50 comprises, for example, two context cameras in stereoscopic mode to enable the fingers D detected on the image to be located in three dimensions in the three-dimensional space formed by the acquisition volume 10, notably by triangulation. By way of a reminder in this case, other embodiments can use other techniques as alternatives to or in addition to stereoscopic visualization, such as time-of-flight cameras or even a three-dimensional vision system using structured light. For the sake of simplicity, it is assumed in this case that the positioning plane P of the part of the hand M corresponds to the average plane in which the part of the hand of the user is located, i.e. in this case, the four fingers. Advantageously, computing the current positioning plane P enables a check to be carried out of the match between the current positioning plane P determined by computation and the predetermined plane: assuming (required by guidance), before executing the following steps, that the user will be able to be shown the result of the check by means of a dedicated message aimed at either maintaining the correct position or correcting the incorrect position.

FIG. 5a shows the first image acquisition step E4a by the two-dimensional imaging device.

In a second step, a second guidance instruction is given to the user to ask them to position their hand (whether or not they have withdrawn it) in the acquisition volume 10 with an average orientation relative to the previous position, corresponding to a horizontal plane, of between 20° and 50°, for example 45° anti-clockwise, as shown in FIG. 5b. In order to reach this second position relative to the first position (flat), the movement of the hand corresponds to a rotation of 45° about the orientation vector V of the hand (corresponding to the longitudinal axis of the portion of the hand), with said orientation vector V of the hand remaining fixed, corresponding to a rolling movement about the pivot axis Ap, which is the axis of rotation of the object plane, with this pivot axis Ap by (optical) design passing through the center of symmetry of the acquisition volume, in this case a parallelepiped (in FIGS. 5a, b, c the acquisition volume is depicted in the form of a parallelepiped).

The second step E3b of determining the current (second) positioning plane P of the part of the hand is applied as before. As before, correct positioning can be checked so as to avoid triggering two-dimensional image acquisition while the part of the hand is not positioned as required.

On the basis of this second positioning plane P, a comparison of the first and second planes P is used to deduce a modification Ed=OK of the current positioning plane P of the part of the hand in accordance with expectations (guidance). It should be noted that, as a variant, detecting the modification of the positioning plane P can be automatically acknowledged after a timeout at the end of the guidance instruction.

The modification E5b of the orientation of the object plane is then controlled by rotating about the pivot axis Ap that in this case is obtained by modifying the image plane, i.e. by rotating the sensor 401 about the axis of rotation Ap' of the sensor. The motor control setpoint for orienting the sensor is therefore a function of the determined current (second) positioning plane P (in this case assumed to be known, but said positioning plane also can be computed or estimated on the basis of previous three-dimensional information within the context of estimating the trajectory of the fingers, notably for the second (continuous) guidance mode). The control module uses the orientation information of the determined current positioning plane P (the second) to provide an instruction to orient the sensor 401 at a given angle configuration so that the second acquired two-dimensional image is sharp on the four fingers of the hand. This configuration is illustrated in FIG. 5b, where the sensor 401 is oriented at an angle of −4° relative to the horizontal plane, i.e. rotated about the axis of rotation Ap' of the sensor 401 in a clockwise direction (opposite the direction of rotation of the hand movement). The value of the orientation angle of the sensor 401 is imposed by the control module and is predetermined as a function of the optical parameters (mainly the focal length of the lens 402 or the distance between the center of symmetry of the acquisition volume 10 and the center of the sensor 401) and the optical magnification of the two-dimensional imaging device. This configuration in this case allows fingerprint information to be recorded from the left sides of the fingers. In the embodiment illustrated in FIGS. 5a, 5b and 5c, an optic (objective lens) with a focal length of 25 mm and magnification of 0.07 allows an area of approximately 70 cm by 70 cm to be imaged, which is sufficient, on average, for imaging an entire hand. Advantageously, for each positioning plane P, the value of the orientation angle of the sensor 401, or the values of the motor control parameters to be applied, is previously defined in a table, notably stored as a configuration calibration in the non-transient memory 603. These orientation angles of the sensor 401 are notably predefined optically and according to the guidance mode (sequential or continuous) so that the acquired two-dimensional images in common (in particular two-by-two) include imaged points of the part of the hand, while covering the entire surface of the fingers to be imaged with the expected positioning planes. This partial coverage of the surface that is to be depicted is then used during the step E6 of merging the acquired two-dimensional images of the surface of said part of the hand that is to be depicted, in this case allowing a merged image to be obtained for each of the four fingers.

FIG. 5b shows the second consecutive image acquisition step E4b by the two-dimensional imaging device 40.

In a third step, a third guidance instruction is given to the user asking them to position their hand in the acquisition volume 10 with an average orientation opposite the previous one, i.e. 45° clockwise relative to the initial position, as illustrated in FIG. 5c. In order to reach this third position relative to the second position (at 45°), the movement of the hand corresponds to a rotation in the opposite direction to the previous one of 90° about the orientation vector V of the hand, corresponding to a rolling movement about the pivot axis Ap.

The third step E3c of determining the current (third) positioning plane P of the part of the hand is applied as before.

On the basis of this third positioning plane P, Ed=OK is deduced for a modification of the current positioning plane P of the part of the hand in accordance with expectations (guidance).

The modification of the orientation of the object plane is then controlled by rotating about the pivot axis Ap, in this case obtained by modifying the image plane, i.e., by rotating the sensor 401 about the axis of rotation Ap' of the sensor. The sensor 401 is oriented by 4° in the opposite direction. This configuration is illustrated in FIG. 5c, in which the orientation of the sensor 401 relative to the horizontal plane is +4°, i.e. a rotation about the axis of rotation Ap' of 8° in the opposite direction to the previous one. This configuration in this case allows the fingerprint information on the right sides of the fingers to be recorded.

FIG. 5c shows the third consecutive image acquisition step E4c by the two-dimensional imaging device 40.

During successive acquisitions E4a, E4b, E4c (the order of which could have been different), the various determined current positioning planes P describe a rolling angular scanning range of at least 15°, in this case even 90°, with the pivot axis Ap being parallel to the orientation vector V of the hand. In other words, at least two of the acquired two-dimensional images have current positioning planes P inclined together by at least 15°.

The three (non-limiting) successively acquired images of the four fingers, with different orientations of the average plane of the hand, are stored in the transient memory 602 and are sequentially sent to the central unit 601 of the processing device 600.

The modifications to the orientation of the sensor 401 allow the image plane to be oriented in a plane conjugate to the determined current positioning plane P, thus making the object plane and the determined current positioning plane P coincide.

The acquired three-dimensional information is also sent to the central unit 601 of the processing device 600.

The step E6 of merging the acquired two-dimensional images and the step E7 of associating the acquired two-dimensional images with the three-dimensional information are carried out by the central unit 601. This association step E7 can be at the same time as or after the reception of the two-dimensional images and three-dimensional information, and can involve a two-by-two pairing of acquired images and three-dimensional information forming pairs of acquired two-dimensional images and acquired three-dimensional information at the same instant or substantially at the same instant, or the association can involve associating an acquired two-dimensional image with a three-dimensional representation estimated on the basis, for example, of tracking movement resulting from the analysis of the acquired three-dimensional information.

The step E8 of reconstituting an unwrapped image of the surface of the part of the hand that is to be depicted by using the determined three-dimensional information associated with the acquired two-dimensional image is carried out, in this case by the central unit 601, by processing the previously associated images, and, by virtue of the principle of overlapping certain points of the surface to be depicted in the two-dimensional images, the pairs of images can be positioned in relation to each other so as to three-dimensionally reconstitute the surface that is to be depicted.

The sequence for the method is the same in the second guidance mode, with the user describing a slow continuous movement with their hand, during which movement the three-dimensional information E2 is acquired, allowing the current positioning plane P of the hand to be determined E3a in real-time by a real-time analysis of the acquired three-dimensional information, and allowing the orientation of the movable optical element about the axis of rotation Ap' to be synchronously controlled as a function of the determined current positioning plane P. In this case, the rotation of the movable element is therefore automatically controlled, preferably by a servo loop or a predetermined orientation scan.

During the movement of the hand of the user, then the following occurs in this case:
  a first acquisition E4a of a first image of part of the surface of the hand that is to be depicted, with the hand stretching in a first positioning plane P relative to a reference frame of the acquisition volume and the object plane being oriented along a first plane;
  a second acquisition E4b of a second image of part of the surface of the hand that is to be depicted, with the hand stretching in a second positioning plane P relative to a reference frame of the acquisition volume, with said second positioning plane P being different from the first, and the object plane being oriented along a second plane, different from the first, with at least some of the points of the surface that is to be depicted acquired between the two two-dimensional images being common to the two consecutive acquisitions, since the movement of the hand is less between the two images, with the movement of the hand being limited (which will not, however, necessarily be true between the extreme images, namely, the first and last acquired two-dimensional images, as this depends on the movement of the hand).

As a variant, the control also can be in the form of predetermined scanning of the movable optical element with a posteriori selection of the two-dimensional images for which the hand was in the required plane.

The same operating modes apply in the event that the objective lens 402 is movable, with the two cases being equivalent, it should just be noted that in this case the image plane is not modified. When the movable optical element is the objective lens 402, there is an optical equivalence to the mode in which the movable optical element is the sensor, with the axis of rotation Ap' passing through the optical center of the objective lens 402, so as to rotate, as before, the objective lens 402 so that the plane P', conjugate to the current positioning plane P determined from the part of the hand, coincides with the sensor plane.

Although the present invention has been described above with reference to specific embodiments, the present invention is not limited to the specific embodiments, and modifications within the scope of application of the present invention will be obvious to a person skilled in the art.

The invention claimed is:

1. A method for contactlessly capturing a biometric fingerprint of part of a hand of a user in an acquisition volume, said method comprising the following steps:
   illuminating the acquisition volume so as to illuminate the part of the hand of the user;
   successively acquiring at least two two-dimensional images of the part of the hand, involving, between said successive acquisitions of said at least two images, modifying an orientation of an object plane by rotating about a pivot axis, said at least two images comprising imaged points of the part of the hand common to said at least two acquisitions, said object plane being modified as a function of a modification of a given current plane for positioning the part of the hand, corresponding to the average current plane in which said part of the hand is located, for each two-dimensional image acquisition; and
   merging the acquired two-dimensional images of a surface of said part of the hand that is to be depicted.

2. The method as claimed in claim 1, wherein the method further comprises, for at least one acquired two-dimensional image;
   determining three-dimensional location information for said part of the hand acquired in said two-dimensional image; and
   associating the determined three-dimensional location information with said acquired two-dimensional image.

3. The method as claimed in claim 2, wherein the method further comprises reconstituting an unwrapped image of the surface of the part of the hand that is to be depicted by using the determined three-dimensional information associated with the acquired two-dimensional image.

4. The method as claimed in claim 2, wherein, for the acquired two-dimensional image the step of determining the current positioning plane of the part of the hand is carried out by analyzing the three-dimensional information associated with said acquired two-dimensional image.

5. The method as claimed in claim 1, wherein the part of the hand comprises at least two fingers or a palm of the hand, with the surface that is to be depicted respectively extending from a first edge of a nail to a second edge of a nail via the pulp of each finger or from a first edge of the palm to a second edge of the palm via a palmar face of the hand.

6. The method as claimed in claim 1, wherein the modification of the orientation of said object plane by rotating about the pivot axis is obtained by rotating the image plane about an axis of rotation.

7. The method as claimed in claim 1, wherein the method further comprises a step of guiding the user promoting a change from the current positioning plane of the hand of the user to another suggested positioning plane of the hand of the user, by displaying virtual hand positions, with said virtual hand positions reflecting a rolling rotation of said virtual hand about the pivot axis relative to the current positioning plane of the hand of the user.

8. The method as claimed in claim 7, wherein said positioning plane of the hand of the user is suggested so that, during successive acquisitions, the successive determined positioning planes define a rolling angular scanning range of at least 10°.

9. A non-transitory information storage medium, partially or fully readable by a computer or a microprocessor, and comprising code instructions of a computer program for executing each of the steps of the method as claimed in claim 1.

10. A capture system for contactlessly capturing a biometric fingerprint of part of a hand of a user, comprising:
a user compartment delimiting an acquisition volume; and an electronic compartment, the acquisition volume being adapted to receive said part of the hand of the user, the electronic compartment comprising:
means for illuminating the acquisition volume so as to illuminate the part of the hand of the user; and
a two-dimensional imaging device with a fixed imaging axis, comprising at least two optical elements, including a sensor and an objective lens, with one of the two optical elements being free to rotate about the axis of rotation of the two-dimensional imaging device, said imaging device being capable of successively acquiring at least two images of the part of the hand, including, between said successive acquisitions of said at least two images, modifying the orientation of an object plane by rotating about a pivot axis and obtained by rotating said movable optical element, wherein
said capture system further comprises:
a module for determining the positioning plane of the part of the hand, corresponding to the average current plane in which said part of the hand is located;
a module for modifying the object plane as a function of a modification of the determined current plane for positioning the part of the hand for each two-dimensional image acquisition; and
a module for merging the acquired two-dimensional images of a surface of said part of the hand that is to be depicted.

11. The capture system as claimed in claim 10, wherein the rotatable optical element is the sensor.

12. The capture system as claimed in claim 10, further comprising:
a device for the three-dimensional acquisition of three-dimensional information from the acquisition volume;
a module for determining three-dimensional location information for said part of the hand in at least one acquired two-dimensional image;
a module for associating the determined three-dimensional location information with said acquired two-dimensional image; and
a module for reconstituting an unwrapped image of the surface of the part of the hand that is to be depicted by using the determined three-dimensional information associated with the acquired two-dimensional image.

13. The capture system as claimed in claim 10, wherein, for each determined current positioning plane, the plane of the movable optical element is modified by rotating about the axis of rotation of said movable optical element, so that the plane conjugate to the determined current positioning plane of the part of the hand is coincident with a sensor plane.

14. The capture system as claimed in claim 10, wherein the acquisition volume in the user compartment comprises an entry section formed by a front opening and has a depth that allows the part of the hand to be inserted from a tip of the fingers, in a longitudinal direction, with said acquisition volume being of variable height in a transverse direction with a central constriction.

15. The capture system as claimed in claim 14, wherein the height of the front opening at the central constriction measures 30 mm to 60 mm.

* * * * *